US009083765B2

(12) United States Patent
Rehman et al.

(10) Patent No.: US 9,083,765 B2
(45) Date of Patent: Jul. 14, 2015

(54) SYSTEMS AND METHODS OF OFFLINE PROCESSING

(75) Inventors: Samuelson Rehman, San Francisco, CA (US); Anit Chakraborty, Burlingame, CA (US); Hui Li, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2840 days.

(21) Appl. No.: 10/884,077

(22) Filed: Jul. 2, 2004

(65) Prior Publication Data

US 2006/0004927 A1    Jan. 5, 2006

(51) Int. Cl.
G06F 15/16    (2006.01)
H04L 29/08    (2006.01)
G06F 17/30    (2006.01)
H04L 29/06    (2006.01)

(52) U.S. Cl.
CPC ........ *H04L 67/327* (2013.01); *G06F 17/30861* (2013.01); *H04L 67/24* (2013.01)

(58) Field of Classification Search
CPC ................................................ G06F 17/30861
See application file for complete search history.

(56) References Cited

U.S. PATENT DOCUMENTS

| | | | |
|---|---|---|---|
| 5,832,218 A | 11/1998 | Gibbs et al. | |
| 5,893,116 A | 4/1999 | Simmonds et al. | |
| 6,072,490 A | 6/2000 | Bates et al. | |
| 6,457,879 B1 | 10/2002 | Thurlow et al. | |
| 6,460,060 B1 | 10/2002 | Maddalozzo, Jr. et al. | |
| 6,591,288 B1 * | 7/2003 | Edwards et al. | 709/203 |
| 6,931,439 B1 | 8/2005 | Hanmann et al. | |
| 6,990,534 B2 * | 1/2006 | Mikhailov et al. | 709/250 |
| 7,167,705 B2 * | 1/2007 | Maes | 455/432.1 |
| 7,349,943 B2 * | 3/2008 | Lin et al. | 709/203 |
| 2003/0074204 A1 | 4/2003 | Krothapalli et al. | |
| 2003/0184582 A1 | 10/2003 | Cohen | |
| 2003/0208559 A1 | 11/2003 | Velline et al. | |
| 2003/0233404 A1 | 12/2003 | Hopkins | |
| 2004/0003031 A1 | 1/2004 | Brown et al. | |
| 2004/0064570 A1 | 4/2004 | Tock | |
| 2004/0205068 A1 * | 10/2004 | Iyer et al. | 707/10 |
| 2005/0091340 A1 | 4/2005 | Facemire et al. | |
| 2005/0102370 A1 * | 5/2005 | Lin et al. | 709/217 |
| 2005/0165735 A1 | 7/2005 | Lin et al. | |
| 2005/0262302 A1 * | 11/2005 | Fuller et al. | 711/119 |

OTHER PUBLICATIONS

U.S. Office Action dated Nov. 1, 2007, for U.S. Appl. No. 10/977,741, filed Oct. 29, 2004.
Internetsoft Corp, "Offline Navigator 1.05", SoftwArea.Com/offline. htm, 2003, pp. 1-3.

(Continued)

*Primary Examiner* — Wen-Tai Lin
(74) *Attorney, Agent, or Firm* — Kraguljac Law Group, LLC

(57) ABSTRACT

Systems, methodologies, media, and other embodiments associated with offline processing are described. One exemplary system embodiment can include a link detection logic configured to determine a link status of the network connection where the link status includes an online state and an offline state. An offline logic can be configured to allow the application to continue operating when the network connection is in the offline state by redirecting network communications sent from the application and storing the network communications in a post data store. The offline logic can be configured to submit the network communications from the post data store to the remote device when the link status changes to the online state.

41 Claims, 8 Drawing Sheets

(56) References Cited

OTHER PUBLICATIONS

Oracle Corporation, "Oracle Application Server Wireless Client FAQ Questions", otn.oracle.com, Feb. 24, 2004, pp. 1-5, Oracle Corporation.

J. Wang, M. Scardina, "Making XML Technology Easier to Use", Oracle White Paper, Aug. 2003, pp. 1-17, Oracle Corporation.

Oracle Corporation, "Oracle Application Server Wireless 10g-Wireless Client", Oracle Datasheet, Jan. 22, 2004, pp. 1-4, Oracle Corp.

Oracle Corporation, "Oracle Application Server 10g Wireless Client—User's Guide", OTN Preview Release, Nov. 2003, pp. 1-37, Oracle Corp.

U.S. Office Action dated Apr. 30, 2008, for U.S. Appl. No. 10/977,741, filed Oct. 29, 2004.

* cited by examiner

SYSTEMS AND METHODS OF OFFLINE PROCESSING

CROSS REFERENCE TO RELATED APPLICATIONS

This application is related to U.S. patent application entitled, "Parameter Passing in Web Based Systems", Ser. No. 10/977,741 filed Oct. 29, 2004, inventors: Rehman et al., which is also assigned to the present assignee.

BACKGROUND

Many computing devices, including mobile computing devices, are capable of communicating to remote devices over a network like the Internet. In one example, a client-side computing device can allow a user to receive data from and provide data to a web-based application provided by a server. If the web-based application includes XHTML/XFORMS documents, data submissions are performed while an on-line connection is available. For example, posting of instance data using an XFORM from the computing device to the server requires the network connection and/or the server to be available at the time when the post operation is requested. If any part of the network is not available at the time of the request, the post operation will fail and the data may be lost. Examples of the network being unavailable include if a wireless network has no signal, a local area network is disconnected, the server is either busy or temporarily down, and the like.

When the computing device loses it's communication with the server, the user can not continue working with the web-based application until the server and/or the network resumes operation. Additionally, if the user selects an option such as a "next page" button and the network connection is offline, the server will not be available to respond to the selected option and, thus, cannot identify the next page. An error may be issued and the user will not be able to navigate between web-pages until the system becomes online.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa.

DETAILED DESCRIPTION

Figure 1:
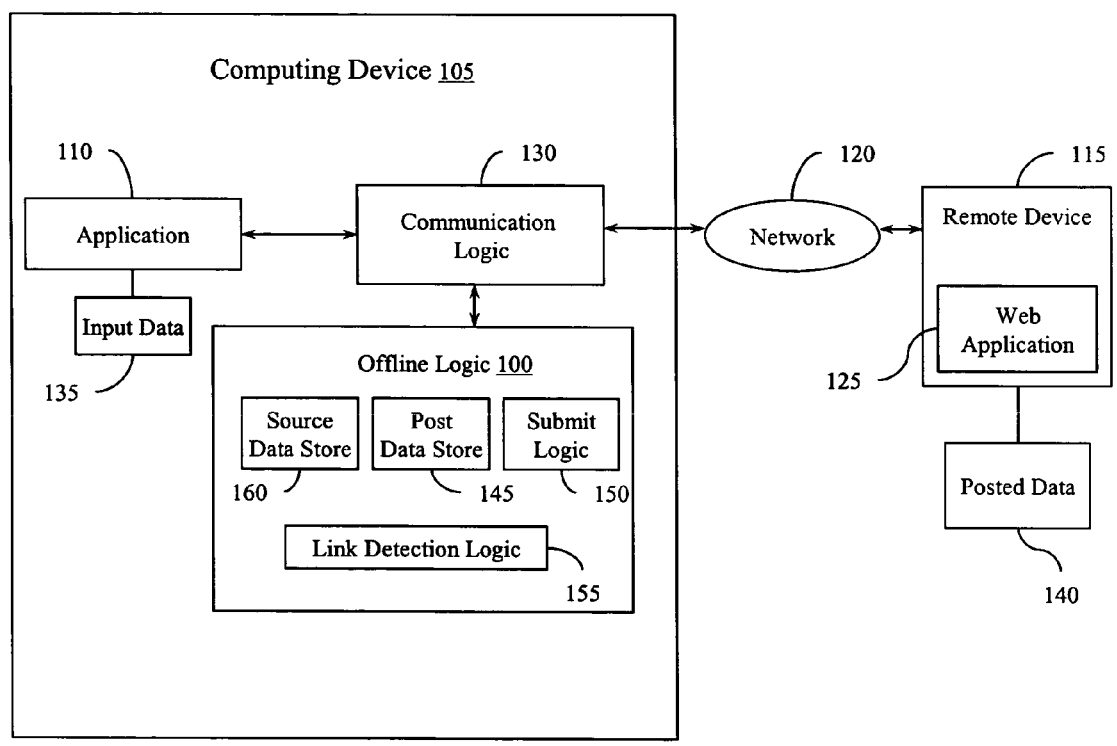
FIG. 1 illustrates an example system diagram of an example offline logic.

In one example, a system can be configured to provide off-line processing of network communications that allows a user operating a computing device to continue working when network connectivity between the computing device and a remote device is lost or is temporarily unavailable. One example environment where the network connection can be intermittent includes a wireless connection that can periodically change between being online and offline.

Suppose the user is interacting with an online web application and is inputting data through, for example, one or more forms provided by the web application. At various times, the user may submit the inputted data to the web application, which will be referred to a submit request. This may occur, for example, when a button is clicked on the screen that would initiate a network operation such as an HTTP "post" operation, a "get" operation, or other network communication operation, if programmed as such. Various types of buttons can include a "submit" button, a "finished" button, or other type of selectable object that is programmed to submit data to the web application. It will also be appreciated that a submit request can occur programmatically without the user having to click a button.

However, if the network connection is offline at the time of the submit request, one example offline system described herein can allow the user to continue working as though the submit request was successful. If additional submit requests are made while the network connection is offline, the example system can be configured to preserve the submitted data until the network becomes available. Once the network is available, the preserved submitted data can then be posted to the web application in an appropriate sequence to create a synchronized state between the data on the web application and the data on the computing device. In one example, the offline system can operate as a background task that is transparent to the user.

It will be appreciated that the term "offline" or "offline state" will be used to refer to any of a variety of conditions that can result in a non-responsive network. For example, the conditions may include, but are not limited to: when a wireless communication link loses it's signal, when a physical connection is disconnected, when a server or other network component is busy, temporarily unavailable, and/or disconnected from the network, and the like.

The following includes definitions of selected terms employed herein. The definitions include various examples and/or forms of components that fall within the scope of a term and that may be used for implementation. The examples are not intended to be limiting. Both singular and plural forms of terms may be within the definitions even when only a singular term is used.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication" or "network communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

Computer-readable medium', as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may Include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device like a field programmable gate array (FPGA), a memory device containing instructions, combinations of logic devices, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Network Communication Protocol examples include network communications between a client computer and a server that may take place using one of several network protocols, such as hypertext transfer protocol (HTTP), file transfer protocol (FTP), Common Internet File System (CIFS) protocol, Gopher, other available protocol, or a custom protocol. For purposes of simplicity, the examples described herein will be generally described with respect to HTTP.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. In the context of a network connection, an operable connection may be created though one or more computing devices and network components. Logical and/or physical communication channels can be used to create an operable connection.

"Signal", as used herein, includes but is not limited to one or more electrical or optical signals, analog or digital signals, a bit or bit stream, and/or other means that can be received, transmitted and/or detected. A signal can also take other forms such as data, one or more computer or processor instructions, messages, and the like.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of methods, algorithms, and/or symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, intercepting, storing, redirecting, detecting, determining, displaying, or the like, refer to actions and processes of a computer system, logic, processor, or similar electronic device that manipulates and/or transforms data represented as physical (electronic) quantities.

Illustrated in FIG. 1 is one example of an offline processing system such as an offline logic 100 that is configured to operate within a computing device 105. The offline logic 100 can be applicable to operate with a variety of computing devices 105 such as a computer, a mobile computer, a handheld computing device, a cellular device, and the like. The computing device 105 can include a software application 110 that is configured to communicate with a remote device 115 using a network connection over a network 120. The remote device 115 can include one or more servers that can provide one or more web applications 125 that can be accessed by a user operating the computing device 105. The network 120 can include one or more networks such as a local area network, wireless network, cellular network, intranet, Internet, and/or combinations of networks.

To facilitate network connectivity, the computing device 105 can include a communication logic 130 that can be configured as a network interface to the network 120. The communication logic 130 can be configured to operate with a variety of network communication protocols. Examples of network interfaces that can be used are described with reference to FIG. 8.

The application 110 can be, for example, a browser that allows a user to interact with the web application 125 once a network connection is established. The browser can include, for example, Netscape communicator, Microsoft's Internet explorer, or any other software application that may be used to interpret and process a markup language, such as HTML, SGML, DHTML, XML, XHTML, XFORMS, or the like. The browser also may include software plug-in applications that allow the browser to interpret, process, and present different types of information. The browser may include any number of application tools, such as, for example, Java, Active X, JavaScript, and Flash. The application 110 can control the display of web pages that may be provided by the web application 125 as the user navigates through the web application 125 (e.g. through web pages and links).

In one example, the web application 125 may include one or more forms that include one or more input fields that allow a user to enter data and submit the data to the web application 125. Example forms may include a questionnaire, a purchase order, a user profile, modifiable account information, and the like. As the user enters data into the forms of the web application 125, input data 135 is created locally on the computing device 105.

At various points in time, the user may submit the input data 135 to the web application 125 as previously described (e.g. by selecting a submit button/object). Transmission of the input data 135 and/or other types of signals from the computing device 105 to the remote device 115 will be generally referred to as "network communications." Input data 135 that is successfully received by the web application 125 is represented by posted data 140. The posted data 140 may be used to create and/or modify data in a database or other type of data store that is used by the web application 125. A successful transmission assumes that the network connection between the computing device 105 and the remote device 115 is in an online state.

If, however, the network connection is in an offline state when a submit request is made, the offline logic 100 is configured to process the submit request and allow the application 110 to continue operating. For example, the offline logic 100 can be configured to redirect network communications sent from the application 110 and store the network communications in a post data store 145 rather than prohibiting the submit request and returning an error message to the application 110. From the point of view of the application 110 and/or the user, the network connection can appear as being online and the submit request can appear as being successfully processed. As long as the network connection is offline, network communications can be redirected to the post data store 145.

In response to the network connection becoming online, the offline logic 100 can then submit the network communications from the post data store 145 to the remote device 115. In one example, the offline logic 100 can be configured to submit the network communications from the post data store 145 in a first in, first out sequence. A submit logic 150 can be provided as part of the offline logic 100 to handle the submission of data from the post data store 145. For example, the submit logic 150 can be configured to execute as a background thread that retrieves each entry from the post data store 145 and initiates an HTTP Post, an HTTP Get, or other suitable operation to transmit the data from each entry to the remote device 115. In this manner, the application 110 can resume its state as though the submitted data was successfully transmitted in the first place.

To determine whether the network connection is in an online state or offline state (e.g. a link status), a link detection logic 155 can be provided. In one example, the link detection logic 155 can be configured to periodically and automatically determine the link status while the application 110 is functioning. In another example, the link detection logic 155 may also be programmed to be initiated in response to a user request. The link detection logic 155 can perform one or more tests to receive information about the network connection and/or network interface. The tests can include, but are not limited to, querying an operating system of the computing device 105, determining whether an IP address is present, querying one or more network components, pinging a gateway server, getting a response from the remote device 115, and the like. Certain tests can be programmed to execute more frequently than others depending on how much time, cost, or resources they require.

In one example, the offline logic 100, and any of its components, can be configured as processor executable instructions provided by a computer-readable medium. The processor executable instructions can execute as one or more background tasks within the computing device 105. The one or more background tasks can included threads. In another example, the offline logic 100 can be configured as a browser or software configured to communicate with a browser, and may be part of the application 110 or software that communicates with the application 110. Other forms of software will be readily appreciated. Additionally, the offline logic 100 can be configured to process network communications that are compatible with one or more formats like XForms, XHTML, HTML, gif, MIME (Multipurpose Internet Mail Extensions) compatible communications.

The offline logic 100 can also allocate a source data store 160 configured to maintain source documents from the web application 125. For example, the web application 125 might include an online employment application that may include five displayable web pages. When a user of the computing device 105 accesses the web pages of the web application 125, the offline logic 100 can be configured to receive one or more documents that define the pages of the employment application in advance (e.g. preload the documents). The pages can be stored in the source data store 160. The preload can be performed to prepare the computing device 105 in case of a lost network connection.

In the event that the network connection changes to an offline state, the offline logic 100 can allow the application 110 and the user to continue navigating the pages of the employment application by retrieving them from the source data store 160. For example, suppose a user is currently entering data on page I of the employment application and the network connection is lost. If the user selects a "next page" button or other type of page navigation function, a network communication will be generated for response by the remote device 115. However, the remote device 115 will not be available to identify what the next page is since the system is offline. In this situation, the offline logic 100 can be configured to redirect the network communications from the application 110 when the system is offline and process the navigation requests using the source data store 160. If page 2 is available in the source data store 160, it can be retrieved and displayed to the user and allow the user to continue working. In this manner, the offline logic 100 can simulate an online state. More detailed examples will be described with reference to the example system of FIG. 2.

Figure 2:
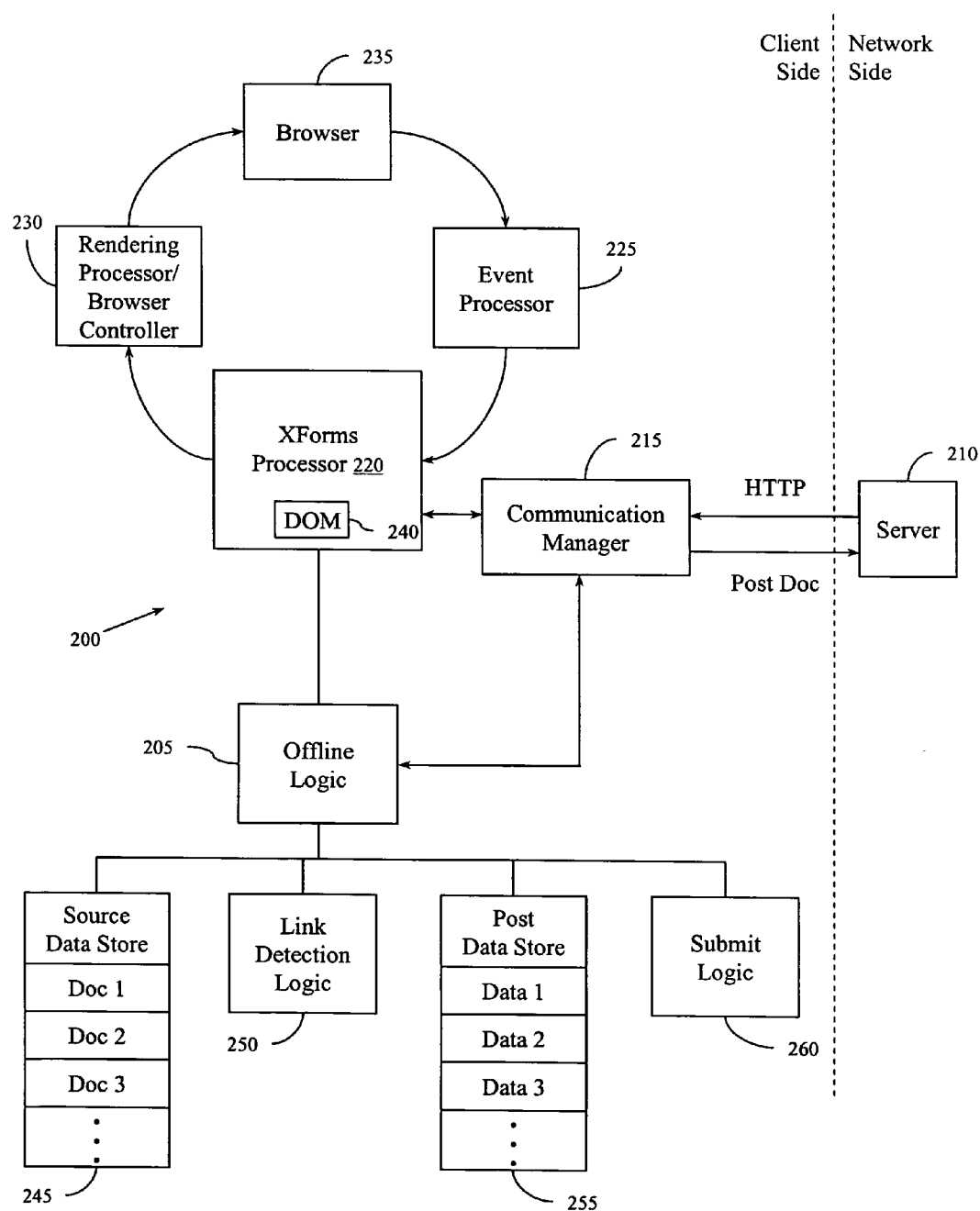
FIG. 2 illustrates an example offline processing system capable of processing XForms-compatible documents.

Illustrated in FIG. 2 is an example offline processing system 200 that can operate with a client-side computing device. The offline processing system 200 can include an offline logic 205 that is configured to process network communications that may be generated by the client-side computing device and directed to a server 210. It will be appreciated that one or more network components can exist between a network interface of the client-side device (e.g. a network communication manager 215) and the server 205, which are not shown in FIG. 2.

The example offline processing system 200 will be described as a system configured to process XForms. "XForms" refers to a specification of web forms that can be used with a wide variety of platforms. The XForms specification as well as other related information is described by the W3C (the World Wide Web Consortium.) at www.w3.org. XForms is an XML application that represents the next generation of forms for the Web. By splitting traditional XHTML forms into three parts: an XForms model, instance data, and user interface, XForms separates presentation from content, allows reuse, gives strong typing, reduces the number of communication round-trips to a server, as well as offering device independence and a reduced need for scripting.

The offline logic 200 can be part of a run-time environment including an engine that can process XForms, process XPath (XML Path language), and render XHTML. The run-time environment can be configured for any desired platform such as a JAVA-based platform, a Microsoft-based platform, or the like. In one example, the processing system 200 can include the offline logic 205, the network communication manager 215, an XForms processor 220, an event routing processor 225, and a rendering processor/browser controller 230. The processing system 200 can be configured as a client-side stack that plugs into a browser 235 and enables the browser 235 to process XForms and other application logic. The system 200 can be configured using any type of logic such as processor executable instructions provided by a computer-readable medium.

The components of the system 200 can be generally described as follows. The network communication manager 215 can be configured to process network communications between the system 200 and a remote device like the server 210 over a network communication link. Once the communication link is established, the network communication manager 215 can receive one or more documents from the server 210 that represent one or more web pages that display information and/or allow information to be inputted based on XForms. In one example, the received documents may be in a serialized format that will be reformatted to it's original form.

The XForms processor 220 is a software application or program that implements and conforms to the XForms specification. The XForms processor 220 can be configured to perform the reformatting function by parsing the serialized document data, and generating a run-time DOM 240 (document object module). The document object module is a representation of the components, attributes, formats, and other properties of the document into objects. The DOM 240 becomes an application programming interface for HTML and XML documents. The DOM 240 defines the logical structure of documents and the way a document is accessed and manipulated. Using the document object module 240, programmers can build documents, navigate their structure, and add, modify, or delete elements and content.

A "containing document", as referred to herein as a document, can be an XHTML document, in which one or more model elements are found. XForms processing places no limits on the number of individual forms that can be placed in a single containing document. When a single document contains multiple forms, each form will have a separate model element, each with an identification attribute so that they can be referenced from other portions in the containing document. An XForms Application Deployment file (.xad) is used to define a list of required resources for an application and can be searched to determine properties of a document.

Figure 3:
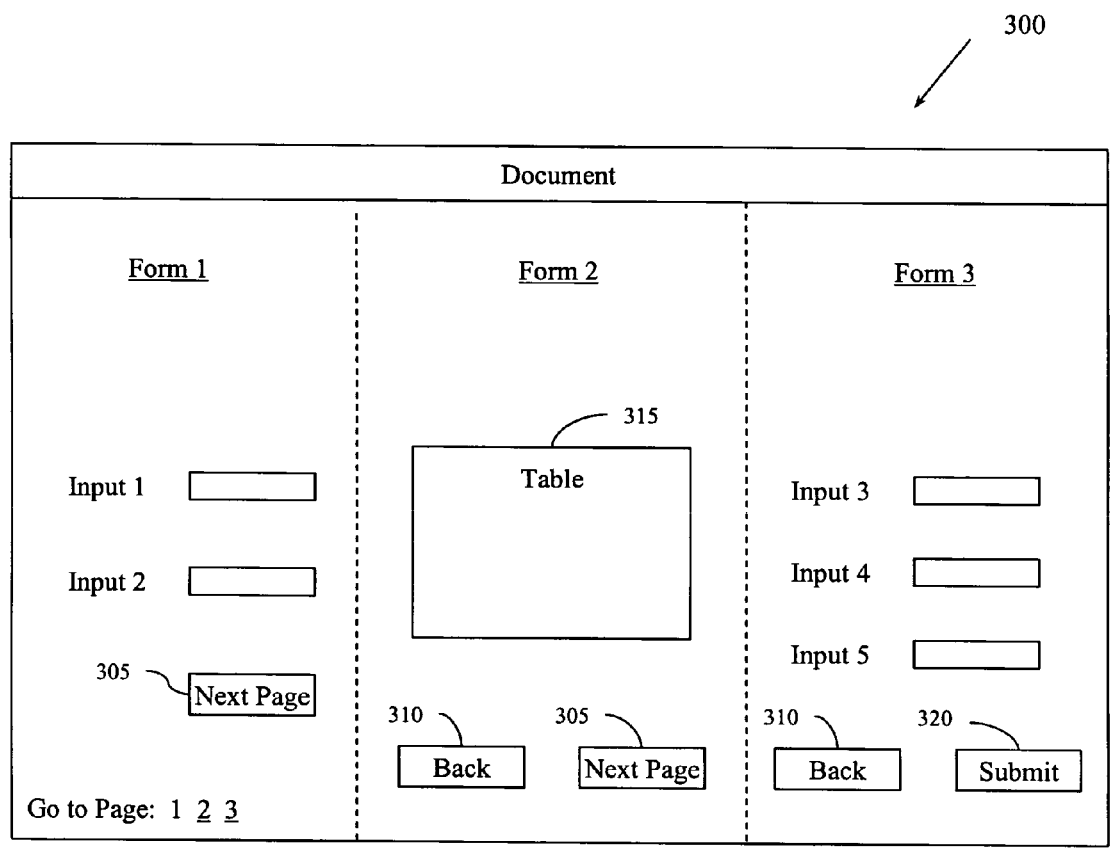
FIG. 3 illustrates an example logical representation of an electronic document that includes multiple forms/pages.

One example of a document is illustrated in FIG. 3. The document 300 is shown with multiple forms such as three separate displayable pages represented by form 1, 2, and 3. The forms 1-3 can be programmatically defined with attributes and linked together so as to allow a user to navigate the pages through displayed page navigation options. For example, a "next page" button 305 when selected can cause the next sequential page/form to be displayed. Similarly, a "back" button 310 will cause the previous form to be displayed. Another type of page navigation option can include a "Go to Page" option that allows a user to jump to a selected page from an available set of pages. Each form may present information to a user such as table 315 and/or one or more data input fields like inputs 1-5.

When the user completes entering data in one or more of the input fields 1-5, a submit button 320 may be selected that can initiate an operation to transfer the inputted data to the server 210. This may be performed, for example, using an HTTP post or get operation, or other type of transmission operation. In general, XForms is designed to gather instance data, serialize it into an external representation, and submit the data with a communication protocol to the server 210.

With reference again to FIG. 2 and the processing system 200, once a received document is parsed and is ready to display, the document is sent from the XForms processor 220 to the rendering processor 230. The rendering processor 230 is configured to translate the document from an internal representation (e.g. the DOM 240) to a format that the browser 235 understands. The browser 235 then displays the document. In one example style sheets can be used to help render the document. At this point, one page from the document is displayed. The document may allow a user to enter information through one or more data entry fields. As described in previous examples, the documents received from the server 210 can be forms that can be completed by a user and submitted back to the server 210. Examples of forms may include a purchase order, a questionnaire, or other type of document that can include data entry fields.

Additionally, once the document is received by the network communication manager 215, the document can be processed by the offline logic 205 and stored in a source data store 245. The source data store 245 can be allocated and configured to maintain received documents. The stored documents (and their multiple forms) can then be used to allow a user to continue processing the documents if the network connection is lost (e.g., an offline state). This will be described in greater detail with reference to page navigation examples.

As previously explained, an offline status can be caused by a variety of conditions that include, but are not limited to, a lost communication signal, non-responsive network components, busy or non-responsive server 210, and the like. In one example, the offline logic 205 can also be configured to periodically determine the status of the communication link to detect whether the status is online or offline. To determine the status of the network connection, a link detection logic 250 can be provided. The link detection logic 250 can be configured to perform a sequence of status tests that can include checking local network interfaces, network components, the server 210, and/or other components that may be part of the network communication channel.

Page Navigation Example

In response to the link status changing to an offline state, the offline logic 205 can be configured to intercept and redirect network communications from the system 200 to be processed locally by the system 200. For example, if the browser 235 is currently displaying "form 1" from document 300 shown in FIG. 3, and the user selects the next page button 305, the server 210 would not be available to identify what the next page is. Rather, the offline logic 205 can be configured to determine what the next page is by using the source data store 245. By reviewing attributes of the current page (e.g. form 1) stored in the data store 245, the next page can be determined (e.g. form 2). If the next page is available in the source data store 245, the offline logic 205 can process the "next page" request locally by retrieving and providing "form 2" to the XForms processor 220 as though "form 2" was received from the server 210. The user can thus continue working in an offline state with no interruption. In another example, a minimal interruption may occur if the offline logic 205 is configured to provide a message to the user indicating that the system is now in an offline state. As long as the source data store 245 contains forms that are associated to a web application, the user of the system 200 can navigate the forms in an offline state as though the system were online.

The offline logic 205 can also be configured to maintain forms from multiple web applications since a user might access different web pages that may activate different web-based applications. Documents received from each different web application can be stored in the source data store 245 with appropriate attributes that identify it's corresponding web application. Other attributes can also be stored such as to identify navigation properties of each document. Example navigation properties for a selected page/form can include identifiers for document name, next page, previous page, or other desired attribute. Thus, when the system 200 is in an offline state and the browser 235 is currently displaying a selected form, the offline logic 205 can provide the appropriate document navigation based on the attributes of each form stored in the source data store 245. In this manner, the offline logic 205 can provide a simulated online state that can be transparently performed to the user.

Data Submission Example

In the event that a submit request is initiated to submit instance data from a form to the server 210, the offline logic 205 can check the link status of the network connection and/or the submit request can be attempted to determine the link status. If the link status is offline, the offline logic 205 can be configured to intercept the associated network communications (e.g. including the data to be submitted) to the web application on the server 210. The data can then be stored in a post data store 255 until the link status becomes online and the data can be posted to the server 210. In one example, the post data store 255 can be configured as a first in, first out queue. Each submitted data (e.g., data 1-3, etc.) can be stored in separate entries in the post data store 255 along with desired state information. From the browser's point of view (and the user's), it will appear as though the data submitted by the user was successfully posted to the web-based application on the server 210. The system, thus, can allow the user to continue accessing and processing the one or more forms from the source data store 245 and continue working rather than having to stop processing due to a networking error.

In response to the link status changing to the online status, which can be detected by the link detection logic 250, the data stored in the post data store 255 can then be sequentially transmitted and posted to the server 210. A submit logic 260 can be configured to perform the submission process as a background task that is transparent to the user. The data from the post data store 255 can be posted to the server 210 in separate operations and in a predetermined sequence that preserves the state of the data. For example, the data can be submitted in a first in, first out sequence. Thus using the offline logic 205, a simulated online state can be provided during an actual offline state that allows a user to continue working and reduces or prevents data from being lost due to a failed network connection.

It will be appreciated that the offline logic 205, the link detection logic 250, and the submit logic 260 can be embodied as processor executable instructions provided by a computer-readable medium. The computer-readable medium can be configured as a plug-in for the browser 235, or can be configured as part of the browser 235. It will be appreciated that one or more, and any combination of the illustrated components of system 200 can be implemented together as software provided by a computer-readable medium.

Example methods may be better appreciated with reference to the flow diagrams of FIGS. 3-7. While for purposes of simplicity of explanation, the illustrated methodologies are shown and described as a series of blocks, it is to be appreciated that the methodologies are not limited by the order of the blocks, as some blocks can occur in different orders, occur at different times, and/or occur concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. In the case where the logic may be software, a flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software logic may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

Each methodology can be embodied by a computer-readable medium that provides processor-executable instructions that are operable with a computing device. The processor executable instructions can be configured to be operable to perform each respective methodology and it's equivalents. The foregoing applies to all methodologies herein.

Figure 4:
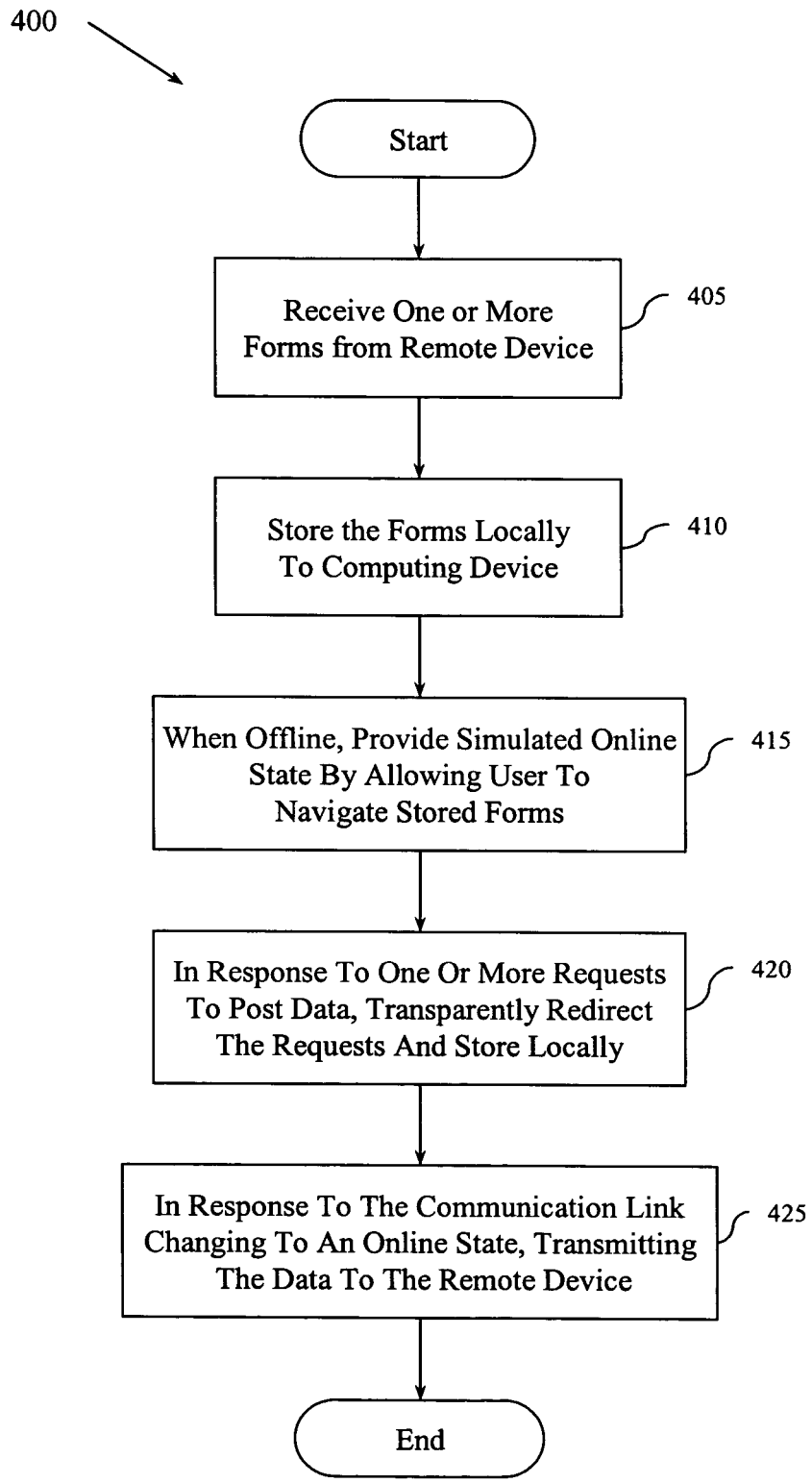
FIG. 4 illustrates an example methodology that can be associated with providing offline processing to a client-side device.

Illustrated in FIG. 4 is an example methodology 400 that can be associated with processing a submit operation from a client-side computing device when network connectivity is in an offline state. The example methodology 400 can initiate by receiving one or more forms from a remote device over a communication link (Block 405). The one or more forms can be part of documents that are transmitted from a web-based application that is accessed by the user operating a computing device. The one or more forms can allow data to be processed online by the user such as by inputting data within data entry fields. The one or more forms can then be stored locally to the computing device in preparation for an offline state (Block 410). Block 410 can include pre-loading the forms from the remote device prior to the user accessing all of the forms through the web-based application. For example, if a user accesses page 1 from a group of forms having ten web pages, some or all of the ten pages can be pre-loaded prior to the user visiting each of the pages.

In response to the communication link changing from an online state to an offline state, a simulated online state can be provided by allowing the user to navigate the one or more forms that are stored (Block 415). In response to one or more requests to post data from the one or more forms to the remote device while the communication link is in the offline state, the data to be posted is locally stored in a sequence (Block 420). In one example, the sequence can be a first in, first out sequence by storing the data in a queue. The user can continue working with the forms stored locally while the network communication link is in an offline state.

It will be appreciated that the requests to post data or to navigate pages can trigger operations that initiate network communications to be transmitted from the computing device to the remote device, and thus to the web-based application. For example, when a user selects a "submit button" that may be present on a displayed page, the "submit button" may be programmed to trigger an event that causes a network communication to be transmitted to the web-based application. An example network communication can be an HTTP Post or Get operation.

To provide a simulated online state during an offline state, these and other network communications generated from the computing device can be intercepted and redirected for local processing on the computing device. In one example, this can be performed transparent to the user. In this manner, the "submit button" and similar options do not have to be reprogrammed in the web-application in order to function in an offline state. Rather, the web application that provides the "submit button" can function as normal by initiating a network communication in response to the "submit button", but the generated network communications will be redirected and processed locally unknown to the web application.

With further reference to FIG. 4, in response to the communication link changing from the offline state to an online state, the methodology 400 can retrieve the data to be posted based on the stored sequence and transmit the data to the remote device (Block 425). In one example, Block 425 can be performed transparent to the user such as by executing a background thread or other process within the computing device. Likewise, Block 420 can also be performed as a background process while allowing the user to continue accessing the one or more forms.

With reference to Block 415, the methodology can include redirecting a network communication associated with a navigation request to the locally stored data. Similar to the "submit button" example described above, a navigation request can be associated with a programmed option such as a "next page" button, a "previous page" button, and/or other page navigation options. An example navigation request is one that is programmed to initiate a network communication to the web application where the web application will identify the next page to be transmitted to the user and displayed. It will be appreciated that this type of navigation request differs from the typical "back" or "previous" functions provided by a browser. These browser functions allow a user to view previously visited web pages that are locally stored and thus, do not initiate or require a network communication to the web application in order to identify the next or previous page. The "back" and "previous" functions are not active functions of a web application.

To provide offline page navigation, in another example, the methodology 400 can include determining a page structure of the one or more forms that are received from the remote device. The page structure can be determined by parsing and analyzing attributes of each form and storing each form with it's associated attributes. Examples of attributes can include, but are not limited to, an application name of the web application from which the form originated, a document name associated with the form, and/or associations to other forms that are accessible from the current form. The user can then be allowed to navigate through the one or more forms while in the offline state using the page structure. In one example, processing for the one or more forms can be provided based on XHTML/XForms documents.

To determine the status of the communication link, and thus to determine whether offline processing should be initiated, the status can be periodically determined. For example, the status can be automatically determined by a programmatic process and/or can be triggered by a user.

Figure 5:
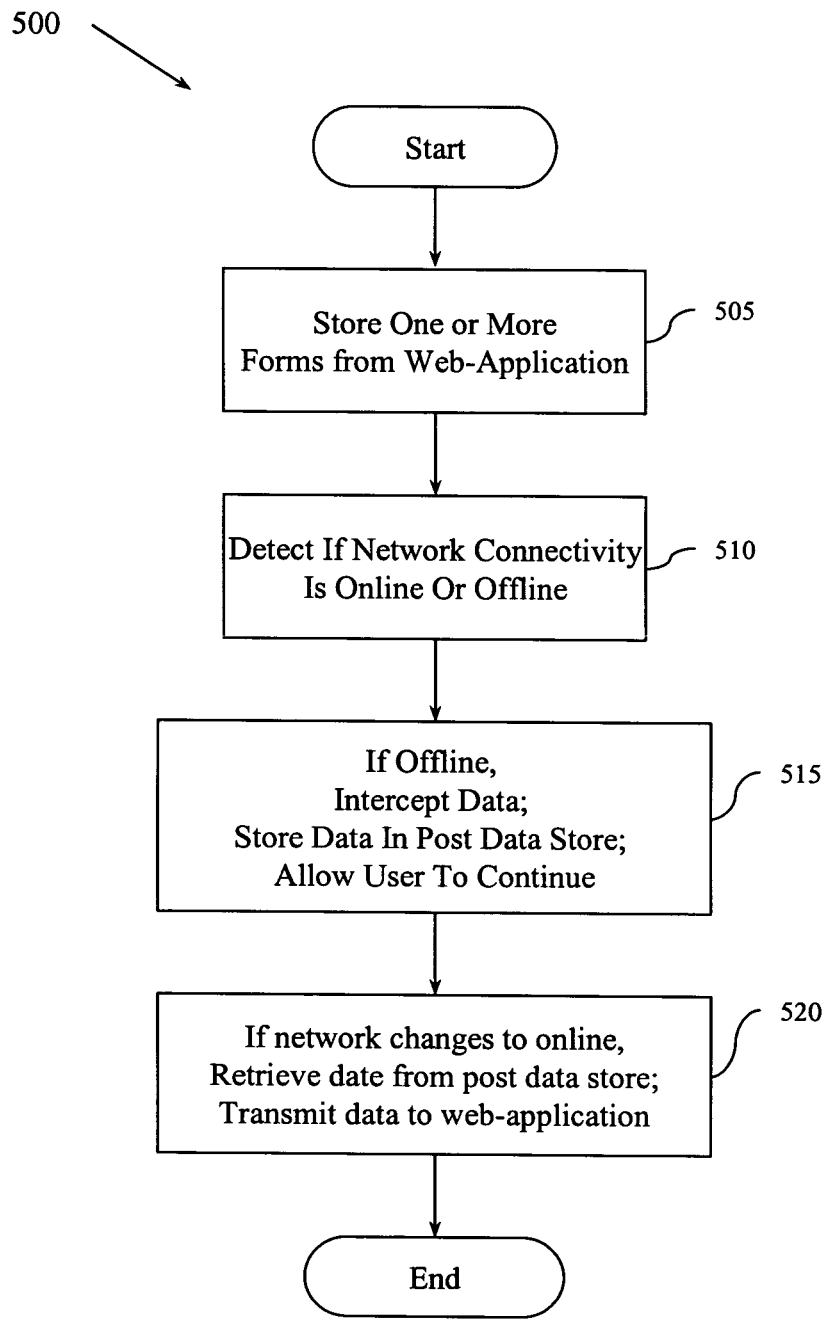
FIG. 5 illustrates an example methodology that can be associated with providing offline processing.

Illustrated in FIG. 5 is one example of a methodology 500 that can be associated with providing offline processing. The following example will be described with reference to a client-side computing device that has established network connectivity to a web-based application during an online session.

The methodology 500 can include storing one or more forms that are from the web-based application as a user navigates the web-based application (Block 505). The forms can be stored in a local data store. At any desired time throughout the methodology, the process can detect if the network connectivity is in an online state or in an offline state (Block 510). If the network connectivity changes to the offline state, offline processing can be initiated. The offline processing can include intercepting data submitted by the user to the web-based application (Block 520). As described in other examples, submitting data would trigger a network communication to the web-based application. Since the network connectivity is offline, the network communication cannot be successfully processed. Rather, the network communication is intercepted and the data to be submitted is stored in a post data store. The user can then be allowed to continue accessing the one or more forms from the local data store as though the data submitted was successfully posted to the web-based application. Data that is subsequently submitted by the user can be stored in a sequence like a first in, first out sequence. If the network connectivity changes to the online state, the data from the post data store can be retrieved and transmitted to the web-based application in a pre-determined sequence (Block 520).

In another example, the methodology 500 can allow the user to navigate the one or more forms from the local data store to simulate network connectivity if the network connectivity changes to the offline state. For example, the methodology can locally process a selected page navigation operation that would result in a network communication if the network connectivity were in the online state. The page navigation operation can be initiated from selectable options such as "next page", "previous page", "page go to", and other types of page navigation functions that may be provided by the web-based application. The methodology 500 may also pre-load the one or more forms from the web-based application to the local data store so that the forms can be available should an offline state occur. The one or more forms can also be parsed to at least determine a page structure of each of the forms so that page navigation can be processed during the offline state.

In one example, the computer-readable medium can be configured to provide software that is a browser or a plug-in for a browser. The one or more forms can include one or more data types including XForms-based documents, XHTML documents, HTML documents, mark-up language documents, and MIME-type documents.

Figure 6:
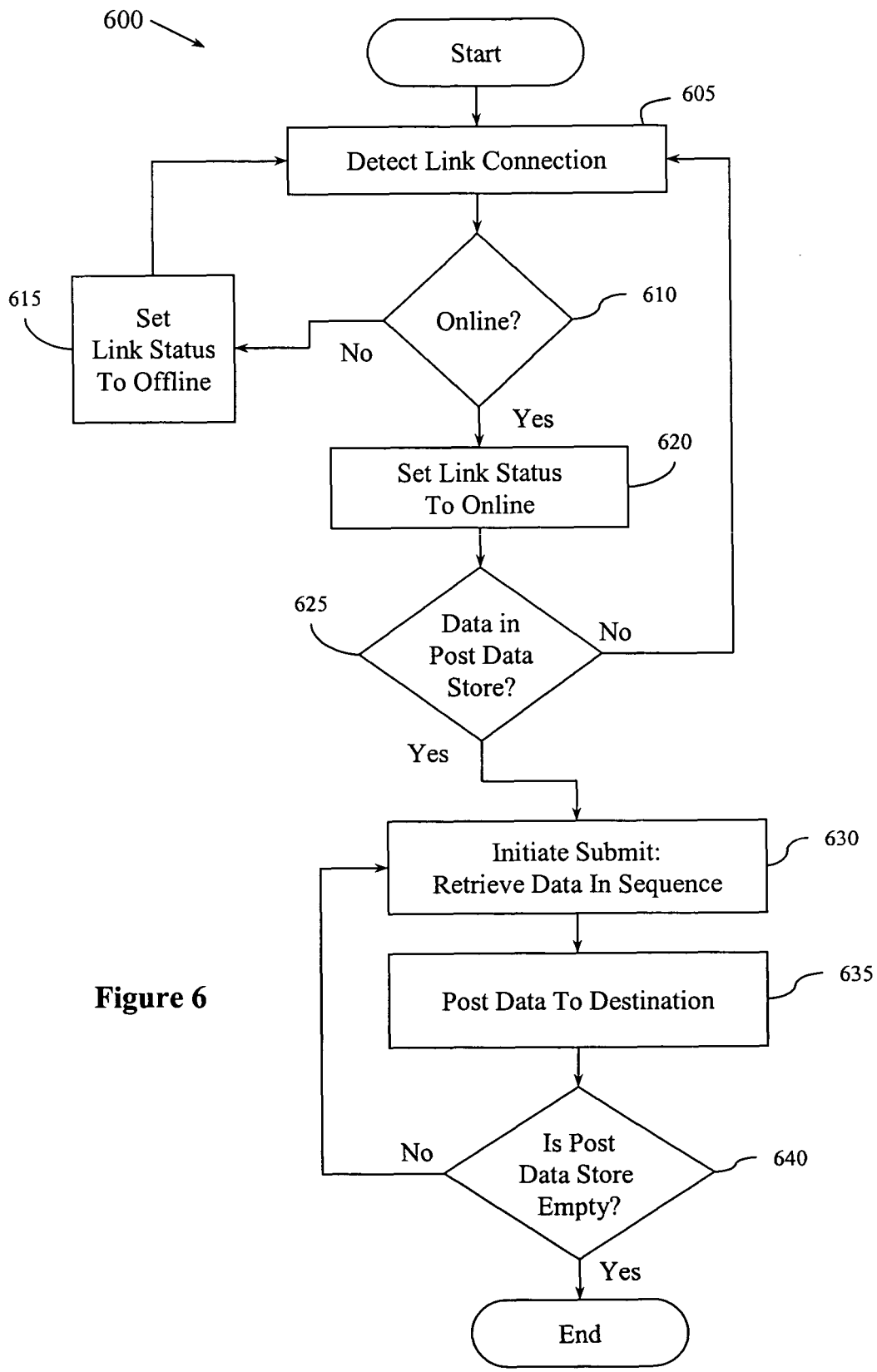
FIG. 6 illustrates an example methodology that can be associated with detecting a status of a link connection and submitting data to a remote destination.

Illustrated in FIG. 6 is an example methodology 600 that can be associated with detecting a status of a network communication link and submitting data to a web application when the communication link changes from an offline state to an online state. In one example, the methodology 600 can be configured as one or more background processes such as executable threads that can function transparently to a user and/or client-side application. The example method 600 can be viewed and/or configured as multiple processes. For example, Blocks 605-625 can be associated with a link detection process and Blocks 630-640 can be associated with a data submission process.

The link detection process can be periodically initiated and executed from programmatic commands and/or from a user command. The term "periodically" is also intended to include a configuration where the process is continuously active. Detecting the link connection is represented at Block 605. One or more sequences of tests can be performed to determine whether the link connection is in an online state or an offline state as described in previous examples. If the link connection is offline at Block 610, a link status signal can be set to represent the offline state (Block 615). The link status signal can be used, for example, to initiate offline processing of network communications as described in any one of the previous examples.

If the link connection is in an online state at Block 610, the link status signal is set to an online state (Block 620). In a situation where a computing device was in an offline state and has changed to an online state, meaning that network communication has been re-established, offline processing of data may have occurred. For example, if one or more submit operations occurred during the offline state, data that was intended to be posted to the web application would have been redirected to a post data store as previously explained. At Block 625, a determination is made whether data exists in the post data store. If no data exists, then no further action is taken and the process can return to detecting the link connection periodically (Block 605).

If data exists in the post data store, then a submit operation can be initiated (Block 630). Data in the post data queue can then be retrieved according to a pre-determined sequence in which it was stored. The data can then be posted or otherwise transmitted to a network destination (e.g., a web application associated with the data) (Block 635). Once the submission is successful, a check can be made to see if additional data exists in the data store (Block 640). If there is more data to submit, the process returns to Block 630 where the next data in the sequence is retrieved and the process is repeated. Once the post data store is empty, the submit process can be terminated.

Figure 7:
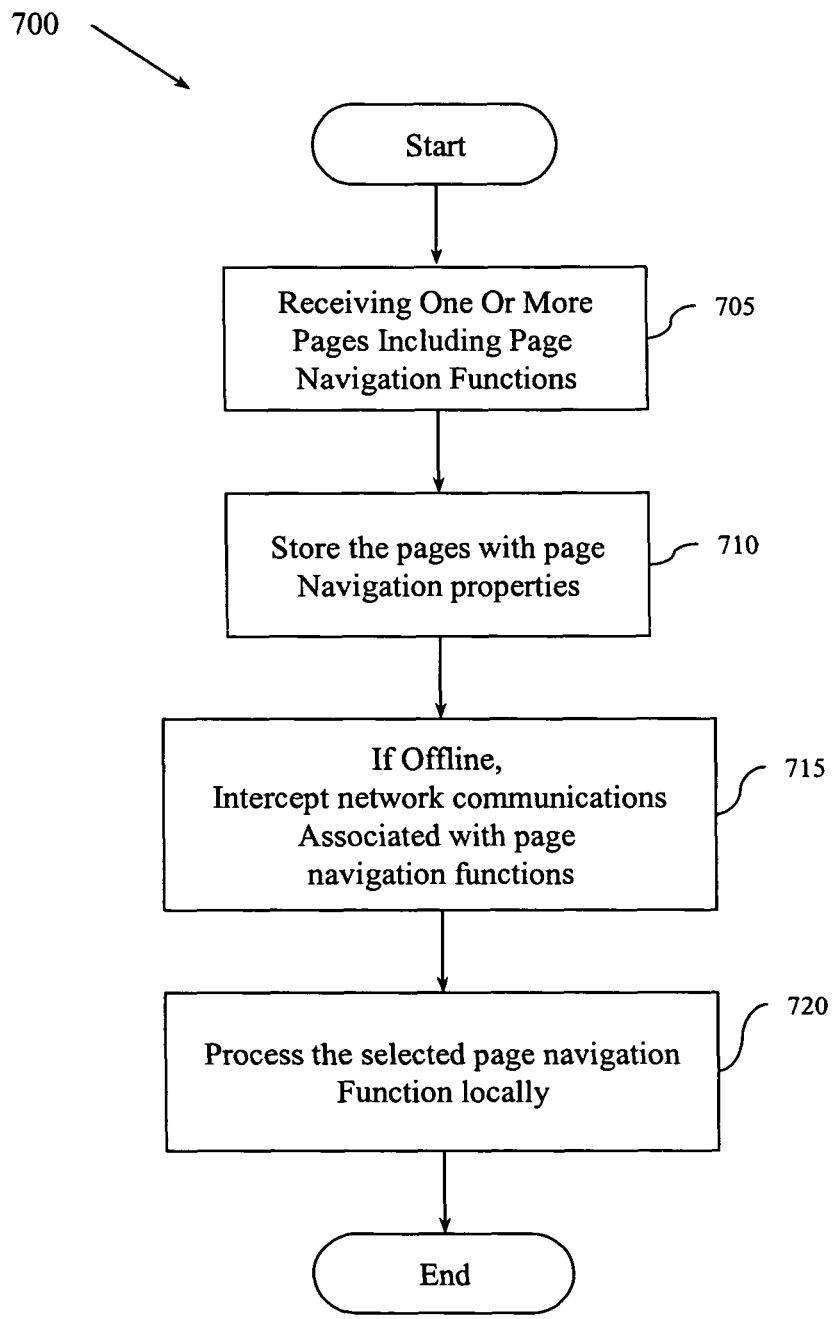
FIG. 7 illustrates an example methodology that can be associated with providing offline processing of page navigation functions.

Illustrated in FIG. 7 is an example methodology 700 that can be associated with providing offline processing of page navigation functions. An example will be described that is operable with a client-side computing device capable of interacting with an online application using a network connection. The methodology can begin when one or more pages are received from an online application (e.g., a web-based application) (Block 705). The one or more pages can include one or more page navigation functions that are selectable by a user. When a selected page navigation function is initiated, the function will generate network communications to be transmitted to the online application in order to respond to the page navigation function. As previously described, examples of page navigation functions include buttons, objects, and/or links that allow a user to actively move between web pages of the online application. These may include a next page button, a previous page button, page number links from a list of pages, a "page go to" command, and the like. As a general example, a page navigation function can include a function that requests the online application to change a currently displayed page to a different page.

The pages are then stored in a source data store along with page navigation relationships that are defined between the web pages (Block 710). In one example, the one or more web pages are received in a format compatible with XForms and/or other type of mark-up language. Each page can be analyzed such as by parsing it's attributes to determine the page navigation relationships. Blocks 705 and 710 can be performed repeatably as new pages are received from the online application.

When it is detected that the network connection changes to an offline state, network communications that may be generated that are associated with a selected page navigation function are intercepted (Block 715). The selected page navigation function can then be processed locally using the source data store and the page navigation relationships to determine the next page (Block 720). The next page can then be displayed on the client device. In this manner, a simulated online state can be provided rather than prohibiting the user from working on the online application.

In one example, the intercepting Block 715 can include redirecting the network communications so that the network communications are responded to locally by the client device. In another example, the intercepting can include prohibiting the network communications from being transmitted over the network connection, which is currently not responding.

Figure 8:
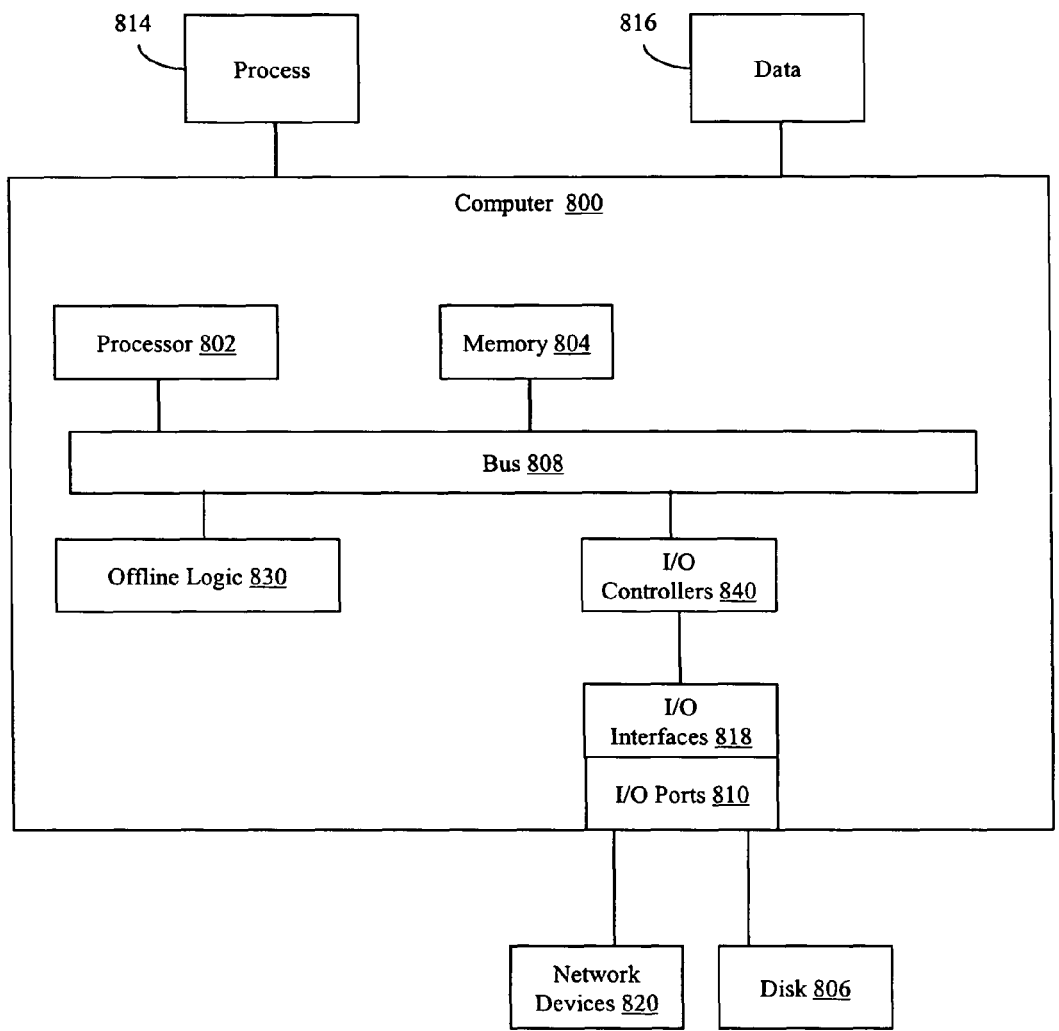
FIG. 8 illustrates an example computing environment in which example systems and methods illustrated herein can be implemented and/or can operate within.

FIG. 8 illustrates an example computing device in which example systems and methods described herein, and equivalents, can operate. The example computing device may be a computer 800 that includes a processor 802, a memory 804, and input/output ports 810 operably connected by a bus 808. The computer 800 can be a mobile device, a cellular device, or other electronic device that can process data. In one example, the computer 800 may include an offline logic 830 configured to facilitate offline processing when a network connection is lost. The offline logic 830 can be implemented similar to the other example offline logics 100, 205 described in FIGS. 1 and 2, respectively, and/or the other systems and methods described. The offline logic 830 can be configured to provide the previously described offline submit operations and/or the offline page navigation operations.

Generally describing an example configuration of the computer 800, the processor 802 can be a variety of various processors including dual microprocessor and other multi-processor architectures. The memory 804 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the computer 800 via, for example, an input/output interface (e.g., card, device) 818 and an input/output port 810. The disk 806 can include, but is not limited to, devices like a magnetic disk drive, a solid state disk drive, a floppy disk drive, a tape drive, a Zip drive, a flash memory card, and/or a memory stick. Furthermore, the disk 806 can include optical drives like a CD-ROM, a CD recordable drive (CD-R drive), a CD rewriteable drive (CD-RW drive), and/or a digital video ROM drive (DVD ROM). The memory 804 can store processes 814 and/or data 816, for example. The disk 806 and/or memory 804 can store an operating system that controls and allocates resources of the computer 800.

The bus 808 can be a single internal bus interconnect architecture and/or other bus or mesh architectures. While a single bus is illustrated, it is to be appreciated that computer 800 may communicate with various devices, logics, and peripherals using other busses that are not illustrated (e.g., PCIE, SATA, Infiniband, 1394, USB, Ethernet). The bus 808 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 800 may interact with input/output devices via i/o interfaces 818 and input/output ports 810. Input/output devices can include, but are not limited to, a keyboard, a microphone, a pointing and selection device, cameras, video cards, displays, disk 806, network devices 820, and the like. The input/output ports 810 can include but are not limited to, serial ports, parallel ports, and USB ports.

The computer 800 can be configured to operate in a network environment and thus may be connected to network devices 820 via the i/o devices 818, and/or the i/o ports 810. Through the network devices 820, the computer 800 may establish a communication link and interact with a network. Through the network, the computer 800 may be logically connected to remote computers. The networks with which the computer 800 may interact include, but are not limited to, a local area network (LAN), a wide area network (WAN), and other networks. The network devices 820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11 and other versions), Bluetooth (IEEE 802.15.1 and other versions), radio frequency and/or cellular based protocols, and the like. Similarly, the network devices 820 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system configured to operate within a computing device where the computing device includes an application configured to communicate with a remote device using a network connection, the system comprising:

a source data store within the computing device that stores a plurality of forms received from the remote device during execution of the application, where the plurality of forms include a plurality of data input fields to receive data for submission to the remote device;

a link detection logic configured to determine a link status of the network connection where the link status includes an online state and an offline state;

an offline logic configured to allow the application to continue operating when the network connection is in the offline state by providing a simulated online state by allowing a user of the computing device to navigate between pages of the plurality of forms that are stored in accordance with a page structure relationship determined between the plurality of forms, by allowing data to be inputted to the plurality of data input fields while in the offline state, and to allow the plurality of forms to generate network communications to be sent to the remote device, responsive to user interaction with the plurality of forms;

where the offline logic is configured to identify navigation options associated with the plurality of forms to determine page structure relationships between the plurality of forms, where a navigation option is an option that is programmed in a form to initiate a network communication to the remote device to cause the remote device to determine a next page in the plurality of forms; and redirecting the network communications and storing the network communications and the data from the plurality of data input fields in a post data store; and the offline logic being configured to submit the network communications and the data from the plurality of data input fields from the post data store to the remote device when the link status changes to the online state.

2. The system of claim 1 where the link detection logic is configured to periodically determine the link status.

3. The system of claim 1 where the offline logic is configured to submit the network communications from the post data store in a first in, first out sequence.

4. The system of claim 1 where the system is configured as processor executable instructions that execute as one or more background tasks within the computing device.

5. The system of claim 4 where the one or more background tasks include threads.

6. The system of claim 1 where the network communications are based on XForms.

7. The system of claim 1 where the network communications include one or more of: XForms, XHTML, HTML, gif, and mime compatible communications.

8. The system of claim 1 where the network connection includes a wireless connection.

9. The system of claim 1 where the offline logic is configured to operate transparently to a user of the application.

10. The system of claim 1 where the system is embodied in a non-transitory computer-readable medium including stored processor executable instructions that implement at least the link detection logic and the offline logic and is configured as one of: a browser, or a software plug-in for a browser.

11. A method, comprising:

receiving a plurality of forms from a remote device over a communication link, where the plurality of forms are programmatically interconnected as a sequence of pages and allow data to be processed online by a user;

storing the plurality of forms in a memory local to a computing device, where the plurality of forms include a plurality of data input fields to receive data for submission to the remote device;

analyzing the plurality of forms to generate page structure relationships between the plurality of forms to determine the sequence of pages;

in response to the communication link changing from an online state to an offline state, determining the sequence of pages of the plurality of forms and providing a simulated online state by allowing the user to navigate between the sequence of pages of the plurality of forms that are stored in accordance with the page structure relationships, and allowing data to be inputted to the plurality of data input fields while in the offline state;

in response to one or more requests to post data from the plurality of data input fields from the plurality of forms to the remote device while the communication link is in the offline state, transparently redirecting the one or more requests and locally storing the data from the plurality of data input fields to be posted in a sequence; and in response to the communication link changing from the offline state to an online state, retrieving the data inputted to plurality of data input fields to be posted based on the sequence and transmitting the data to the remote device.

12. The method of claim 11 further comprising:

identifying navigation options associated with the plurality of forms to determine the page structure relationships between the plurality of forms, where a navigation option is a navigation request that is programmed in a form to initiate a network communication to the remote device to cause the remote device to determine a next page in the plurality of forms; and where allowing the user to navigate includes redirecting the network communication associated with the navigation request to the locally stored data.

13. The method of claim 11 further including periodically determining the status of the communication link.

14. The method of claim 11 where the step of storing the data includes storing state information for the data to be posted.

15. The method of claim 11 where the steps of retrieving and posting are performed transparent to the user.

16. The method of claim 11 where transparently redirecting and storing the data is performed as a background task while allowing the user to continue accessing the plurality of forms.

17. The method of claim 11 where analyzing the plurality of forms to generate the page structure relationships includes identifying attributes from the plurality of forms to determine sequence associations between pages of the plurality of forms; and allowing the user to navigate through the plurality of forms while in the offline state using the page structure relationships.

18. The method of claim 11 where locally storing the data is stored in the sequence based on a first in, first out sequence.

19. The method of claim 11 further including providing processing for the plurality of forms being based on XHTML/XFORMS documents.

20. A system for an electronic device having an application that can communicate with a web-based application over a communication link, the device having an online state and an offline state, the system comprising:

means for providing offline processing of network communications sent from the electronic device including:

means for storing a plurality of forms in a memory local to the electronic device;

means for processing the plurality of forms compatible with at least XForms;

means for parsing the plurality of forms to identify page navigation functions programmed within the plurality of forms where a page navigation function causes the web-based application to determine and display a next page in the plurality of forms, and for generating page navigation relationships between the plurality of forms using the identified page navigation functions;

means for providing a simulated online state by allowing the plurality of stored forms to be navigated in the offline state by processing the page navigation functions in accordance with the page navigation relationships, where network communications to the web-based application are generated from the forms;

means for redirecting the network communications when the communication link becomes offline;

means for storing the network communications in a post data store to simulate a successful submission of data to the web-based application; and means for submitting the network communications from the post data store to the web-based application when the communication link becomes online.

21. The system of claim 20 where the plurality of forms include a plurality of data input fields to receive data for submission to the remote device; and where the means for providing a simulated online state further allows data to be inputted to the plurality of data input fields while in an offline state.

22. The system of claim 20 further including means for detecting whether the communication link is in the online state or the offline state.

23. The system of claim 20 where the network communications include communications that are initiated from a selection within the application.

24. The system of claim 20 where the means for submitting synchronizes a state of the application and a state of the web-based application after submitting the network communications.

25. The system of claim 20 where the system includes processor executable instructions stored on a computer-readable medium.

26. A non-transitory computer-readable medium including executable instructions that when executed by at least a processor of a computing device cause the computing device to perform a method, the executable instructions comprising instructions for:

receiving a plurality of forms from a remote device over a communication link, where the plurality of forms are programmatically interconnected as a sequence of pages and allow data to be processed online by a user;

storing the plurality of forms in a memory local to the computing device, where the plurality of forms include a plurality of data input fields to receive data for submission to the remote device;

analyzing the plurality of forms to generate page structure relationships between the plurality of forms to determine the sequence of pages;

in response to the communication link changing from an online state to an offline state, determining the sequence of pages of the plurality of forms and providing a simulated online state by allowing the user to navigate between the sequence of pages of the plurality of forms that are stored in accordance with the page structure relationships, and allowing data to be inputted to the plurality of data input fields while in the offline state;

in response to one or more requests to post data from the plurality of data input fields from the plurality of forms to the remote device while the communication link is in the offline state, transparently redirecting the one or more requests and locally storing the data from the plurality of data input fields to be posted in a sequence; and in response to the communication link changing from the offline state to an online state, retrieving the data inputted to plurality of data input fields to be posted based on the sequence and transmitting the data to the remote device.

27. The non-transitory computer-readable medium of claim 26 further comprising instructions for identifying navigation options associated with the plurality of forms to determine the page structure relationships between the plurality of forms, wherein a navigation option is a navigation request that is programmed in a form to initiate a network communication to the remote device to cause the remote device to determine a next page in the plurality of forms; and wherein allowing the user to navigate includes redirecting the network communication associated with the navigation request to the locally stored data.

28. The non-transitory computer-readable medium of claim 26 further comprising instructions for periodically determining a state of the communication link.

29. The non-transitory computer-readable medium of claim 26 further comprising instructions for performing the transparently redirecting and the locally storing of the data as a background task in the computing device.

30. The non-transitory computer-readable medium of claim 26 wherein the instructions for analyzing the plurality of forms to generate the page structure relationships include instructions for:

identifying attributes from the plurality of forms to determine sequence associations between pages of the plurality of forms; and allowing the user to navigate through the plurality of forms while in the offline state using the page structure relationships.

31. A method performed by an electronic device having an application that can communicate with a web-based application over a communication link, the electronic device having an online state and an offline state, the method comprising:

providing offline processing of network communications sent from the electronic device including:

storing a plurality of forms in a memory local to the electronic device;

processing the plurality of forms compatible with at least XForms;

parsing the plurality of forms to identify page navigation functions programmed within the plurality of forms where a page navigation function causes the web-based application to determine and display a next page in the plurality of forms, and generating page navigation relationships between the plurality of forms using the identified page navigation functions;

providing a simulated online state by allowing the plurality of stored forms to be navigated in the offline state by processing the page navigation functions in accordance with the page navigation relationships, where network communications to the web-based application are generated from the forms;

redirecting the network communications when the communication link becomes offline;

storing the network communications in a post data store to simulate a successful submission of data to the web-based application; and submitting the network communications from the post data store to the web-based application when the communication link becomes online.

32. The method of claim 31 wherein the plurality of forms include a plurality of data input fields to receive data for submission to the remote device; wherein the method further comprises providing a simulated online state that allows data to be inputted to the plurality of data input fields while in an offline state.

33. The method of claim 31 further comprising detecting whether the communication link is in the online state or the offline state.

34. The method of claim 31 wherein the network communications include communications that are initiated from a selection within the application.

35. The method of claim 31 wherein the submitting comprises synchronizing a state of the application and a state of the web-based application after submitting the network communications.

36. The method of claim 31 wherein the method is performed by at least a processor in the electronic device executing processor executable instructions stored on a non-transitory computer-readable medium.

37. A method implemented by a computing device where the computing device includes an application configured to communicate with a remote device using a network connection, the method comprising:

storing a plurality of forms received from the remote device during execution of the application, wherein the plurality of forms include a plurality of data input fields to receive data for submission to the remote device;

determining a link status of the network connection where the link status includes an online state and an offline state;

allowing the application to continue operating when the network connection is in the offline state by providing a simulated online state by allowing a user of the computing device to navigate between pages of the plurality of forms that are stored in accordance with a page structure relationship determined between the plurality of forms, by allowing data to be inputted to the plurality of data input fields while in the offline state, and allowing the plurality of forms to generate network communications to be sent to the remote device, responsive to user interaction with the plurality of forms;

identifying navigation options associated with the plurality of forms to determine page structure relationships between the plurality of forms, where a navigation option is an option that is programmed in a form to initiate a network communication to the remote device to cause the remote device to determine a next page in the plurality of forms; and redirecting the network communications and storing the network communications and the data from the plurality of data input fields in a post data store; and submitting the network communications and the data from the plurality of data input fields from the post data store to the remote device when the link status changes to the online state.

38. The method of claim 37 further comprising periodically determining the link status.

39. The method of claim 37 wherein the submitting comprises submitting the network communications from the post data store in a first in, first out sequence.

40. The method of claim 37 wherein one or more actions of the method are performed as one or more background tasks within the computing device.

41. The method of claim 37 further comprising processing the network communications that include: XForms, XHTML, HTML, gif, or mime compatible communications.

* * * * *

UNITED STATES PATENT AND TRADEMARK OFFICE
CERTIFICATE OF CORRECTION

PATENT NO. : 9,083,765 B2  Page 1 of 1
APPLICATION NO. : 10/884077
DATED : July 14, 2015
INVENTOR(S) : Rehman et al.

It is certified that error appears in the above-identified patent and that said Letters Patent is hereby corrected as shown below:

In the Specification

In column 3, line 17, delete "Computer-readable medium'," and insert -- "Computer-readable medium", --, therefor.

In column 3, line 23, delete "Include," and insert -- include, --, therefor.

In column 4, line 29, delete "servelet," and insert -- servlet, --, therefor.

In column 7, line 21, after "page" delete "I" and insert -- 1 --, therefor.

In column 15, line 55, delete "i/o" and insert -- I/O --, therefor.

In column 15, line 63, before "devices" delete "i/o" and insert -- I/O --, therefor.

In column 15, line 63, before "ports" delete "i/o" and insert -- I/O --, therefor.

Signed and Sealed this
Twenty-first Day of June, 2016

Michelle K. Lee
*Director of the United States Patent and Trademark Office*